United States Patent

[11] 3,538,920

| [72] | Inventor | William J. Davis |
|---|---|---|
|  |  | Wyomissing, Pennsylvania |
| [21] | Appl. No. | 659,303 |
| [22] | Filed | Aug. 9, 1967 |
| [45] | Patented | Nov. 10, 1970 |
| [73] | Assignee | The Polymer Corporation |
|  |  | a corporation of Pennsylvania |

[54] POLYAMIDE SMOKE FILTER
2 Claims, No Drawings

[52] U.S. Cl. ............................................................ 131/10,
131/269, 264/126, 55/98, 55/522
[51] Int. Cl. ................................................................ A24d 01/06
[50] Field of Search ........................................... 131/10.7,
10.9, 261, 262, 264, 265, 266, 267, 268, 269;
264/126(Inquired); 55/98

[56] References Cited
UNITED STATES PATENTS

| 2,768,913 | 10/1956 | Hiler | 131/267X |
| 2,806,474 | 9/1957 | Yarsley | 131/265 |
| 2,916,038 | 12/1959 | Wade | 131/264X |
| 3,126,009 | 3/1964 | Mahoney et al. | 131/268X |
| 2,815,760 | 10/1957 | Schreus et al. | 131/262 |
| 3,022,542 | 2/1962 | Davis | 131/269X |
| 3,103,220 | 9/1963 | Mahoney et al | 131/269X |
| 3,217,715 | 11/1965 | Berger et al. | 131/269X |

FOREIGN PATENTS

| 752,358 | 7/1956 | Great Britain | 131/266 |
| 197,732 | 5/1958 | Austria | 131/269 |

*Primary Examiner*—Melvin D. Rein
*Attorney*—Synnestvedt & Lechner

ABSTRACT: A filter made of finely divided polyamide such as nylon useful for removing contaminating substances from gases as in a cigarette filter. Finely divided nylon is prepared by dissolving nylon at an elevated temperature, cooling to produce a precipitate, and washing and drying the precipitate. The precipitate which comprises agglomerates of the polyamide is heat treated and thereafter the resultant product is ground to a mesh size of less than 100.

POLYAMIDE SMOKE FILTER

SPECIFICATION

This invention relates to the filtration of gases, and, more particularly, to absorbent materials particularly useful in removing contaminating substances from gases.

It has been discovered that polyamide resins, when properly prepared in accordance with this invention, are extremely effective in removing various contaminating substances from gases when such gases are brought in contact with or passed through a filter comprised of such resins.

The absorptive material of this invention may find utility, for example, in the purification of industrial gases, as well as in removing noxious or objectional odors from the air as in the home, in passenger aircraft, and sealed means of transportation where the air is continuously recycled, such as in submarines or space craft.

The resinous materials herein disclosed are also of particular utility due to their ability to absorb various products of combustion that result from smoking tobacco in the form of cigarettes, cigars, pipes and the like. In this regard, these resins have proved of particular value since, while they are capable of removing practically all of the visible products of combustion, they still enable a sufficient amount of the flavor of the tobacco to pass through the filter so as to satisfy many smokers. It can be appreciated that this is of extreme importance due to the growing realization of the health hazards involved in smoking, as well as the growing evidence of the presence of carcinogenic materials in tobacco smoke.

Accordingly, it is an object of this invention to provide an improved material for filtering gases.

Another object of this invention is to provide filters for the removal of unwanted substances from gases.

And yet another object of this invention is to provide an improved filter material for removing unwanted odors and gases from the air.

A still further object of this invention is to provide an improved filter material for removing products of combustion from tobacco smoke.

Briefly, these and other objects of this invention are achieved by utilizing polyamide resins in finely divided form as filter materials.

The polyamides with which this invention is concerned may include any of the synthetic linear fiber-forming polyamides and their various homopolymers, copolymers, and interpolymers. Of the more common of these polymers which are readily available in commercial quantities, may be mentioned the polymer of hexamethylenediamine and adipic acid (nylon 6/6); the polymer of hexamethylenediamine and sebacic acid (nylon 6/10); the polymer of e-caprolactam (nylon 6); the polymer of 11-aminoundecanoic acid (nylon 11); and the polymer of caprylactam (nylon 8).

To obtain the absorptive properties in accordance with this invention, it is important that the polyamide resin be prepared in a very finely divided form in order that a high surface to volume ratio will be presented. While polyamide resin in finely divided form may be prepared by mechanical comminution, it is generally impractical to use such mechanical means to prepare polyamide powders of the extremely small size required in the practice of this invention.

Perhaps the easiest and best means to prepare finely divided polyamide powders suitable for use in this invention is by precipitation processes, wherein the polyamides are dissolved in solvents at elevated temperatures and precipitated from solution. The materials so obtained are in extremely finely divided form and may be less than one micron in diameter. Suitable solvents for use in these processes are generally alcohols, and preferably the polyhydric alcohols. Of these, one of the most effective and convenient to use is ethylene glycol, which will dissolve about one-fifth of its own weight of nylon at temperatures approaching its boiling point. These precipitation processes are described in detail in U.S. Pat. No. 2,639,278, which is incorporated herein by reference.

During the precipitation processes, it is believed that the extremely finely divided nylon particles precipitated from solution loosely form together as agglomerates, even though these agglomerates themselves may be no larger than one micron.

The agglomeration of the finely divided particles continues during filtration of the precipitate and during the drying of the wet filter cake.

While the material so filtered and dried is extremely effective as an absorbent, the absorbent properties of the material can still further be increased by a heat treatment as in accordance with U.S. Pat. No. 3,022,542. This latter patent describes a process for preparing highly porous pressed and sintered articles by heat treating the finely divided polyamides precipitated from solution prior to pressing and sintering the shaped article. As mentioned in this patent, it is theorized that the small agglomerates previously referred to that result during precipitation and filtration are hardened and strengthened by the heat treatment without disturbing the minute spaces or pores therebetween. Thus, in subsequent handling of these agglomerates, their porosity is preserved, insuring an extremely high surface to volume ratio.

For convenience, it may sometimes be convenient to conduct the heat treatment operation after the filter cake has been pressed into a pellet. Either the pellet or the powder is heat treated in a nonoxidizing atmosphere until the strength of the agglomerates is increased. If the powder is heat treated in the form of pellets, it is then necessary to grind the pellets to a suitable size (for example, less than 100 mesh) for use and inclusion in a filter. Note, however, that the microporosity and absorptive properties of the polyamide are not adversely affected by the pelletizing step.

The finely divided polyamides may be used in any known manner in conjunction with conventional filters. In the case of cigarettes, the polyamides may be held in the tip of a cigarette by means of a small amount of cotton or filter material, or may be used in a disposable cartridge in connection with a cigarette holder. With respect to the filtration of gases, the polyamides may be held between gas pervious materials to enable the passage of gases therethrough.

The drawing is a schematic view of a cigarette, partially in section. As shown therein, the cigarette is comprised of a body portion 1 which is filled with tobacco encased in a thin cigarette paper. The mouthpiece end of the cigarette contains a filter which is comprised of a region of polyamide resin 2 as prepared in accordance with this invention, held in place in a paper tube by means of filter material 3.

EXAMPLE

One pound of type 6/6 polyamide molding powder was added to five pounds glycol and the mixture gently stirred while its temperature was raised to about 380°F. The stirring was continued for about one hour, and after that time all of the polyamide was dissolved by the glycol. The hot solution was then filtered to remove any foreign matter. The clear solution was placed in a quench tank where the temperature was rapidly reduced to less than 300°F. by the addition of cold water to the solution. A fine precipitate immediately formed and was separated from the mother liquor by means of filtration. The filter cake was washed to remove all the glycol and then as much water as possible was removed by means of a filter press. The wet filter cake removed from the filter press was, for convenience, pressed into small pellets about one-half to one-fourth inch in size. These pellets were then heated under nonoxidizing conditions at a temperature approaching the melting point of the nylon, which in the case was about 450°F. After one hour of this heat treatment, the pellets were removed from the oven and ground to a sufficiently small size so as they would pass through a 100 mesh screen.

A filter from the end of a well-known brand of cigarette was removed with a pair of tweezers and about 30 mg. of finely divided nylon as prepared above was placed in the mouthpiece end of the cigarette and the filter was reinserted. The polyamide took up about one-third of the space previously occupied by the filter. The end of the filter was trimmed off flush with the end of the mouthpiece of the cigarette and the cigarette was smoked by an experienced smoker. While the cigarette drew easily, only a slight trace of smoke could be observed coming from the smoker's mouth when he exhaled—even after a deep and prolonged inhalation. The smoker reported that the smoke was satisfying in that he could taste the flavor of the tobacco.

I claim:

1. A cigarette comprised of a body portion filled with tobacco and a mouthpiece portion adjacent said body portion, said mouthpiece portion serving to filter the contaminating gases passing through said body portion, said mouthpiece portion comprising finely divided agglomerates of polyamide prepared by precipitation process from a saturated solution of polyamide material, the resultant precipitate being heat treated at a temperature and in a manner sufficient to strengthen the bonds within and between the agglomerates without reducing the spacing there between, the resultant product being thereafter reduced to a mesh size of less than 100.

2. A method of removing contaminating substances from gases which comprises passing said gases through a filter the active components of which are comprised essentially of finely divided polyamide material, said polyamide material being initially formed by precipitation process wherein the precipitated particles are on the order of one micron, said particles precipitated in the forming process of said filter clinging loosely together to form agglomerates of irregular shape and size and having a high surface to volume ratio, said agglomerates being pressed into pellets and dried in temperatures less than the melting point of the polyamide by sufficient to strengthen the bonds within and between the agglomerates without reducing the spacing therebetween, whereafter said pellets are reduced to a mesh size of less than 100 by grinding.

UNITED STATES PATENT OFFICE
CERTIFICATE OF CORRECTION

Patent No. 3,538,920     Dated November 10, 1970

Inventor(s) William J. Davis

It is certified that error appears in the above-identified patent and that said Letters Patent are hereby corrected as shown below:

Col. 2, line 68, "the" (3rd occurrence) should read --this-

Col. 4, line 14, "by" should read --but--.

Signed and sealed this 25th day of May 1971.

(SEAL)
Attest:

EDWARD M. FLETCHER, JR.
Attesting Officer

WILLIAM E. SCHUYLER, JR
Commissioner of Patents